US011131140B2

(12) United States Patent
McKenna et al.

(10) Patent No.: US 11,131,140 B2
(45) Date of Patent: Sep. 28, 2021

(54) CORNER JOINT CLIP WITH SELF-BACKING PLATE

(71) Applicant: Arconic Technologies LLC, Pittsburgh, PA (US)

(72) Inventors: Greg B. McKenna, Cumming, GA (US); Ion-Horatiu Barbulescu, Atlanta, GA (US)

(73) Assignee: Arconic Technologies LLC, Pittsburgh, PA (US)

( * ) Notice: Subject to any disclaimer, the term of this patent is extended or adjusted under 35 U.S.C. 154(b) by 433 days.

(21) Appl. No.: 16/215,970

(22) Filed: Dec. 11, 2018

(65) Prior Publication Data
US 2020/0181973 A1    Jun. 11, 2020

(51) Int. Cl.
| *E06B 3/06* | (2006.01) |
| *E06B 3/96* | (2006.01) |
| *E06B 3/968* | (2006.01) |
| *E06B 3/964* | (2006.01) |

(52) U.S. Cl.
CPC .............. *E06B 3/9684* (2013.01); *E06B 3/06* (2013.01); *E06B 3/9642* (2013.01); *E06B 3/9687* (2013.01)

(58) Field of Classification Search
CPC ..... E06B 3/06; E06B 3/16; E06B 3/22; E06B 3/96; E06B 3/9604; E06B 3/9616; E06B 3/964; E06B 3/9642; E06B 3/9644; E06B 3/9647; E06B 3/968; E06B 3/9684; E06B 3/9687
See application file for complete search history.

(56) References Cited

U.S. PATENT DOCUMENTS

| 3,749,432 | A | * | 7/1973 | Janssen | .................... E04B 2/766 52/476 |
| 3,915,579 | A | * | 10/1975 | Offenbroich | .............. F16B 7/18 403/264 |
| 4,607,754 | A | | 8/1986 | Wolf | |
| 5,875,600 | A | | 3/1999 | Redman | |
| 8,057,120 | B2 | * | 11/2011 | Wernlund | ................. F16B 7/18 403/187 |

(Continued)

FOREIGN PATENT DOCUMENTS

| DE | 102019101451 A1 * | 7/2020 | ........... E06B 3/9642 |
| EP | 1245777 A2 * | 10/2002 | ........... E06B 3/9642 |
| KR | 2019910006407 Y1 | 8/1991 | |

OTHER PUBLICATIONS

ISRWO in related PCT/US2019/058051 dated Feb. 12, 2020.

*Primary Examiner* — Ryan D Kwiecinski
(74) *Attorney, Agent, or Firm* — Vorys, Sater, Seymour and Pease LLP

(57) ABSTRACT

A framed assembly includes a first frame member providing an inner vertical wall extending between opposing front and back surfaces and defining a slot, and a second frame member positioned adjacent the first frame member at a corner joint and providing a horizontal wall extending between opposing front and back surfaces of the second frame member. A clip having opposing front and back sides provides a backing plate extending from the back side and a projection extending from the front side. The backing plate is received within an interior of the first frame member via the slot, and the projection is received within an interior of the second frame member adjacent the horizontal wall.

18 Claims, 6 Drawing Sheets

(56) References Cited

U.S. PATENT DOCUMENTS

| | | | |
|---|---|---|---|
| 8,998,527 B2* | 4/2015 | Clark | F16B 7/0473 |
| | | | 403/231 |
| 9,086,083 B2* | 7/2015 | Hooper | F16B 5/0614 |
| 9,127,504 B2* | 9/2015 | Sprague | E06B 3/9642 |
| 9,328,752 B2* | 5/2016 | Emanuel | F16B 2/20 |
| 9,737,175 B2* | 8/2017 | Wei | E06B 3/4636 |
| 2013/0219689 A1 | 8/2013 | Emanuel | |
| 2014/0186103 A1* | 7/2014 | Campbell | E06B 1/366 |
| | | | 403/280 |
| 2016/0123364 A1 | 5/2016 | Hooper et al. | |
| 2020/0308899 A1* | 10/2020 | Alkarram | E06B 3/964 |

* cited by examiner

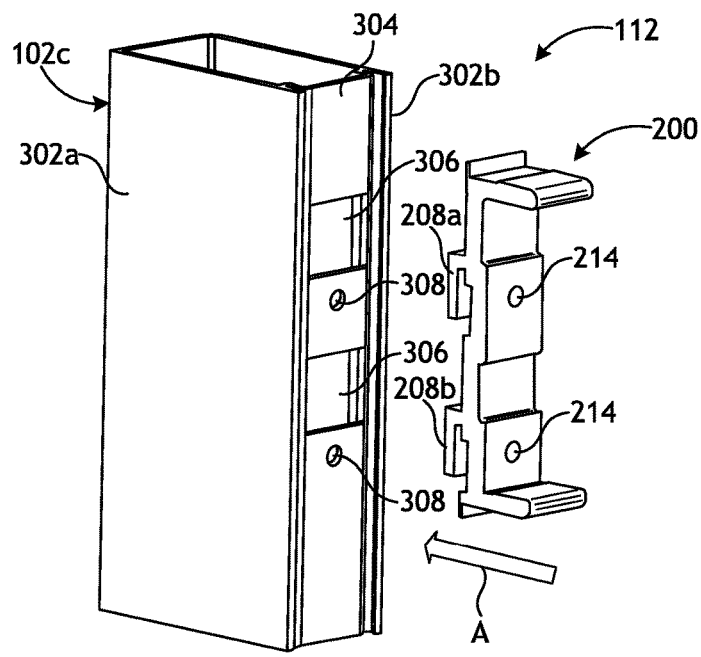
*FIG. 3*
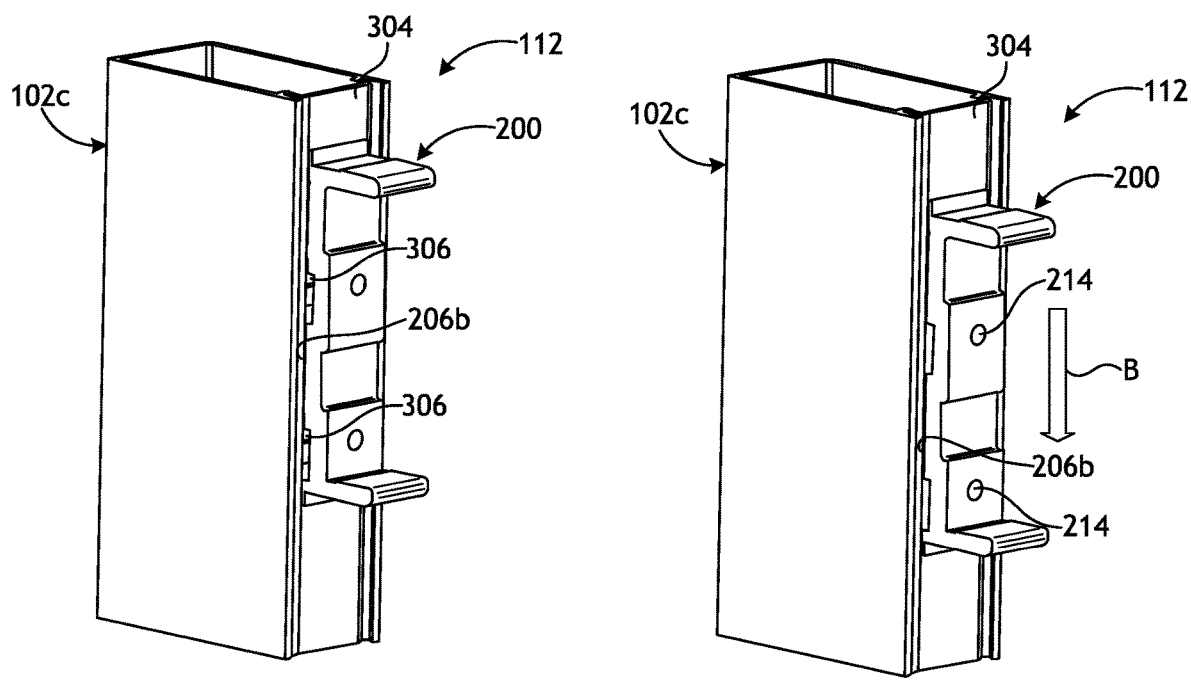
*FIG. 4*  *FIG. 5*

CORNER JOINT CLIP WITH SELF-BACKING PLATE

BACKGROUND

Commercial and residential buildings commonly include framed assemblies to provide doors, doorframes, window vents, and window frames.

Commercial metal doors are one type of framed assembly and typically include vertical side frame members or "stiles" interconnected by top and bottom horizontal frame members or "rails." The stiles and rails are typically hollow, rectangular tubes made from rolled sheet metal, extruded aluminum, or an extruded polymer. An intermediate rail is sometimes incorporated to provide additional structural rigidity, and infill panels (e.g., glass lites) can be placed in the rectangular openings defined by the interconnected stiles and rails.

One issue common to most conventional commercial metal doors concerns the corner joints between the stiles and rails. Commercial doors are typically subject to heavy use and abuse that causes the door to be twisted and racked, which places substantial force at the corner joints. To stabilize the corner joint and simultaneously interconnect the adjacent stile and rail, internal clip assemblies are often used.

As shown in FIG. 10, a conventional clip assembly 1000 typically includes an extruded clip 1002 (e.g., made of aluminum or another rigid material), two discrete backing plates 1004, and two threaded fasteners 1006. The clip 1002 can be mounted to a stile (not shown) by aligning holes 1008 formed in the clip 1002 with corresponding holes defined in the stile. The threaded fasteners 1006 are then extended through the aligned holes of the clip 1002 and the stile and received within threaded holes 1010 formed in the backing plates 1004, which are blindly supported within the interior of the stile. As can be appreciated, it can be a difficult task to blindly support the backing plates 1004 within the interior of the stile and at the proper height to accurately align the holes 1010 in the plates 1004 with the holes 1008 in the clip 1002, thus making this fastening process labor-intensive.

There is a need for improved corner joints for framed assemblies that require less component parts and can be assembled quickly and with a minimal amount of labor.

SUMMARY OF THE DISCLOSURE

Embodiments disclosed herein include a framed assembly that includes a first frame member providing an inner vertical wall extending between opposing front and back surfaces and defining a slot, a second frame member positioned adjacent the first frame member at a corner joint and providing a horizontal wall extending between opposing front and back surfaces of the second frame member, and a clip having opposing front and back sides and providing a backing plate extending from the back side and a projection extending from the front side, wherein the backing plate is received within an interior of the first frame member via the slot, and the projection is received within an interior of the second frame member adjacent the horizontal wall. In a further embodiment of the framed assembly, the framed assembly is selected from the group consisting of a door, a doorframe, a window vent, a window frame, a glazing panel, a curtain wall, a storefront, a skylight, and any combination thereof. In another further embodiment of any of the previous embodiments, the framed assembly may additionally and/or alternatively include a backing plate aperture defined in the backing plate, a clip aperture defined in the clip and coaxially aligned with the backing plate aperture, a stile aperture defined in the inner vertical wall and coaxially aligned with the backing plate aperture and the clip aperture when the backing plate is received in the slot, and a mechanical fastener extendable through the clip aperture, the stile aperture and the backing plate aperture to secure the clip to the first frame member. In another further embodiment of any of the previous embodiments, the framed assembly may additionally and/or alternatively include wherein the mechanical fastener comprises a threaded fastener or a rivet fastener. In another further embodiment of any of the previous embodiments, the framed assembly may additionally and/or alternatively include wherein the mechanical fastener forms an interference fit with at least one of the backing plate aperture and the stile aperture. In another further embodiment of any of the previous embodiments, the framed assembly may additionally and/or alternatively include a gap defined between the backing plate and the back side of the clip, and wherein a portion of the inner vertical wall is positioned within the gap when the clip is mounted to the first frame member. In another further embodiment of any of the previous embodiments, the framed assembly may additionally and/or alternatively include a fillet weld applied at an intersection between the inner vertical wall and the horizontal wall. In another further embodiment of any of the previous embodiments, the framed assembly may additionally and/or alternatively include a flange extending from an end of the clip, wherein heat from the fillet weld melts the flange and causes the flange to adhere to the second frame member. In another further embodiment of any of the previous embodiments, the framed assembly may additionally and/or alternatively include a plug weld that attaches the second frame member to the clip at the projection.

Embodiments disclosed herein may further include a method of assembling a corner joint of a framed assembly that includes mounting a clip to an inner vertical wall of a first frame member by inserting a backing plate extending from a back side of the clip into a slot defined in the inner vertical wall, securing the clip to the first frame member at the inner vertical wall, receiving a projection extending from a front side of the clip within an interior of a second frame member, the second frame member providing a horizontal wall, forming a seam at an intersection between the first and second frame members as the second frame member is mounted to the clip, and joining the second frame member to the first frame member at one or more locations. In a further embodiment, the method may include securing the clip to the first frame member at the inner vertical wall includes coaxially aligning a stile aperture defined in the inner vertical wall with a backing plate aperture defined in the backing plate and a clip aperture defined in the clip, and extending a mechanical fastener through the clip aperture, the stile aperture and the backing plate aperture. In another further embodiment of any of the previous embodiments, the method may additionally and/or alternatively include wherein the mechanical fastener comprises a threaded fastener and the method further comprises threadably receiving the threaded aperture within the backing plate aperture. In another further embodiment of any of the previous embodiments, the method may additionally and/or alternatively include forming an interference fit with the mechanical fastener and at least one of the backing plate aperture and the stile aperture. In another further embodiment of any of the previous embodiments, the method may additionally and/or alternatively include wherein a gap is defined between the backing plate and the back side of the clip, and wherein mounting the clip to the inner vertical wall of a first frame member comprises positioning a portion of the inner vertical wall within the gap. In another further embodiment of any of the previous embodiments, the method may additionally and/or alternatively include wherein joining the second frame member to the first frame member comprises applying a fillet weld at an intersection between the inner vertical wall and the horizontal wall. In another further embodiment of any of the previous embodiments, the method may additionally and/or alternatively include melting a flange extending from an end of the clip with the fillet weld and thereby causing the flange to adhere to the second frame member. In another further embodiment of any of the previous embodiments, the method may additionally and/or alternatively include wherein joining the second frame member to the first frame member comprises applying a plug weld via a weld hole defined in the horizontal wall of the second frame member and thereby attaching the second frame member to the clip at the projection.

Embodiments disclosed herein may further include a clip assembly for a framed assembly that includes a body having a first end and a second end opposite the first end and defining one or more clip apertures, one or more backing plates projecting laterally from a back side of the body and extending downwardly therefrom, wherein at least one backing plate aperture is defined in at least one of the backing plates, each of said backing plate aperture(s) being coaxially aligned with a corresponding one of the one or more clip apertures, one or more projections extending laterally from a front side of the body, and a mechanical fastener extendable through coaxially aligned clip and backing plate apertures. In a further embodiment, the clip assembly may further include a first flange extending vertically upward from the first end, and a second flange extending vertically downward from the second end. In another further embodiment of any of the previous embodiments, the clip assembly may additionally and/or alternatively include wherein the mechanical fastener comprises a threaded fastener or a rivet fastener.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 3-8 are progressive isometric views of one example process of assembling a corner joint of the framed assembly of FIG. 1, according to one or more embodiments.

DETAILED DESCRIPTION

The present disclosure is generally related to framed assemblies for doors and windows and, more particularly, to improved clip assemblies that interconnect and stabilize adjacent frame members at a corner joint.

The embodiments discussed herein describe new clip designs and assembly methods for framed assembly corner joints that eliminate the need for discrete backing plates to be blindly held in place within the interior of a vertical frame member (e.g., a stile) during assembly. The clips described herein may include backing plates integrally formed with the clips. Consequently, part count is reduced and the assembly methods described herein simplify and expedite the assembly process.

One example framed assembly includes a first frame member providing an inner vertical wall extending between opposing front and back surfaces and defining a slot, and a second frame member positioned adjacent the first frame member at a corner joint and providing a horizontal wall extending between opposing front and back surfaces of the second frame member. A clip having opposing front and back sides may provide a backing plate extending from the back side and may further provide a projection extending from the front side. The backing plate may be received within an interior of the first frame member via the slot, and the projection may be received within an interior of the second frame member adjacent the horizontal wall.

Figure 1:
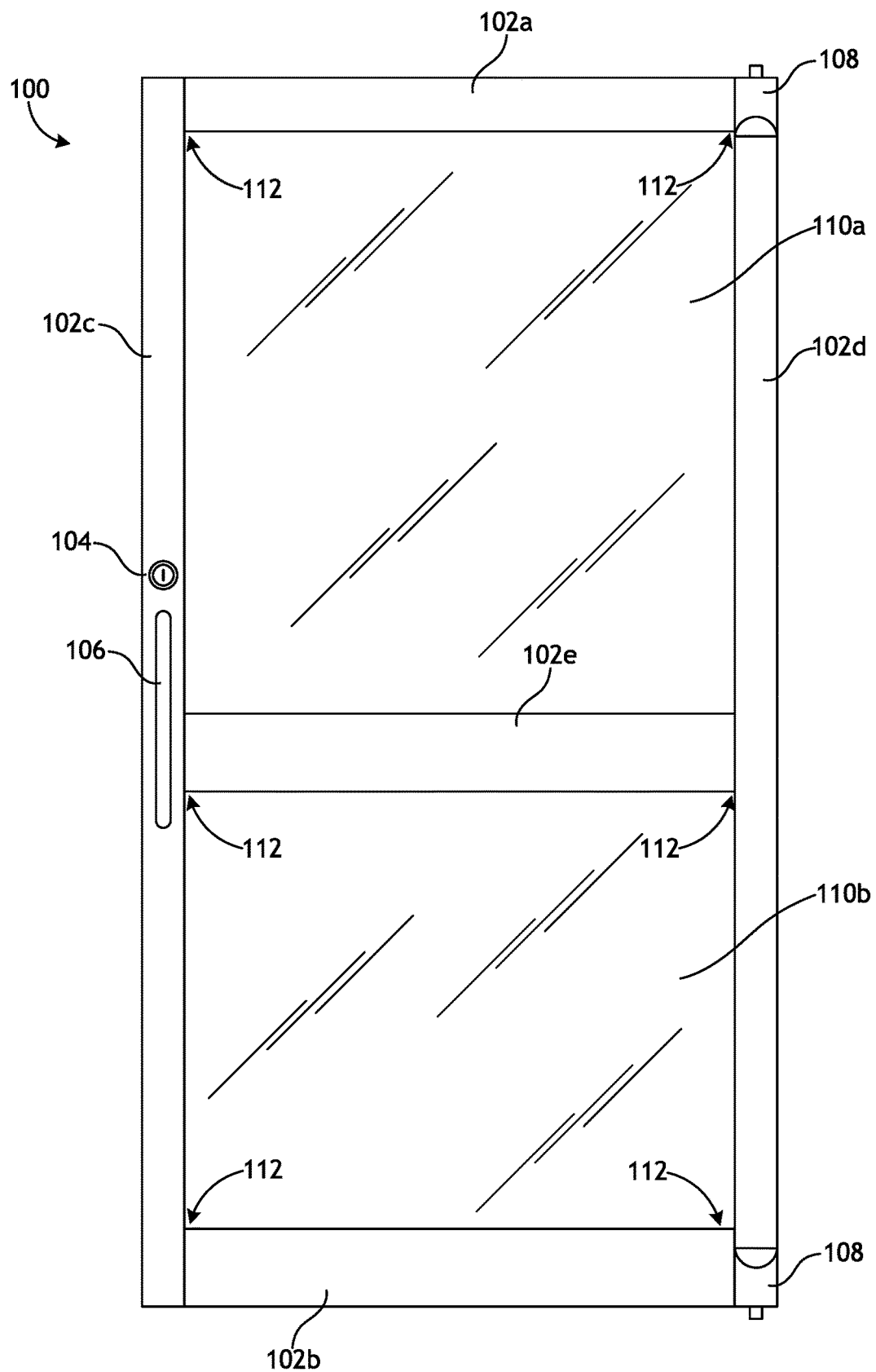
FIG. 1 is a front view of an example framed assembly that may incorporate one or more principles of the present disclosure.

FIG. 1 is a front view of an example framed assembly 100 that may incorporate one or more principles of the present disclosure. In the illustrated embodiment, the framed assembly 100 comprises a door that may be employed in any commercial or residential building setting. The principles of the present disclosure, however, may be equally applicable to other types of framed assemblies including, but not limited to, doorframes, window vents, window frames, glazing panels (alternately referred to as "glazing units"), curtain walls, storefronts, skylights, or any combination thereof. Accordingly, while the following discussion is directed to a door framed assembly, other types of framed assemblies may equally incorporate the presently disclosed features.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure. However, it will be understood that these terms are used for convenience and ease of description only and are not intended to limit the disclosure to any particular orientation.

As illustrated, the framed assembly 100 includes a plurality of frame members, shown as a top frame member 102a, a bottom frame member 102b, and opposing side frame members 102c, 102d extending between the top and bottom frame members 102a,b. An optional intermediate frame member 102e may extend between the side frame members 102c,d at an intermediate location. The top, bottom, and intermediate frame members 102a,b,e are alternately referred to as horizontally-extending "rails," and the side frame members 102c,d are alternately referred to as vertically-extending "stiles." Accordingly, the top, bottom, and intermediate frame members 102a,b,e will be referred to herein as rails 102a,b,e, and the side frame members 102c,d will be referred to herein as first and second stiles 102c,d.

The rails and stiles 102a-e may comprise hollow, generally rectangular tubes made of a variety of rigid materials including, but not limited to, aluminum, rolled sheet metal, a polymer, a composite material (e.g., fiberglass, carbon fiber, etc.), or any combination thereof. In the illustrated embodiment, the first stile 102c includes conventional door hardware, such as a lock 104 and a door handle 106. The opposing second stile 102d includes pivot assemblies 108 provided at opposing ends of the stile 102d for pivotably mounting the framed assembly 100 within a doorframe (not shown).

The rails and stiles 102a-e cooperatively surround and otherwise "frame" first and second center panels 110a and 110b, alternately referred to as "infill" panels. While two center panels 110a,b are depicted, more or less than two may be employed, without departing from the scope of the disclosure. In some embodiments, the center panels 110a,b may each comprise glass lites and, in at least one embodiment, may comprise double paned glass including air, an inert gas, and/or a plastic film(s) between adjacent panes to control transmission of thermal energy.

In other embodiments, however, the center panels 110a,b may alternatively comprise other types of infills such as, but not limited to, a glazing panel, polycarbonate, or another clear, translucent, tinted, or opaque panel, without departing from the scope of the disclosure.

The ends of each rail 102a,b,e are joined to the adjacent stiles 102c,d at corresponding corner joints 112. In some embodiments, as illustrated, the rails and stiles 102a-e may be arranged generally orthogonal to one another at the corner joints 112. In other embodiment, however, the angular offset between the interconnected adjacent rails and stiles 102a-e may be greater or less than 90°, without departing from the scope of the disclosure.

According to embodiments of the present disclosure, one or more of the corner joints 112 may incorporate an improved clip assembly designed to align and join the rails 102a,b,e to the stiles 102c,d, and simultaneously stabilize the connection and thereby help mitigate the effects of heavy use and abuse on the framed assembly 100. The clip assemblies described herein also eliminate the need to blindly support and align discrete backing plates within the stiles 102c,d, thus providing cost and labor savings via simpler and faster assembly processes.

Figure 2B:
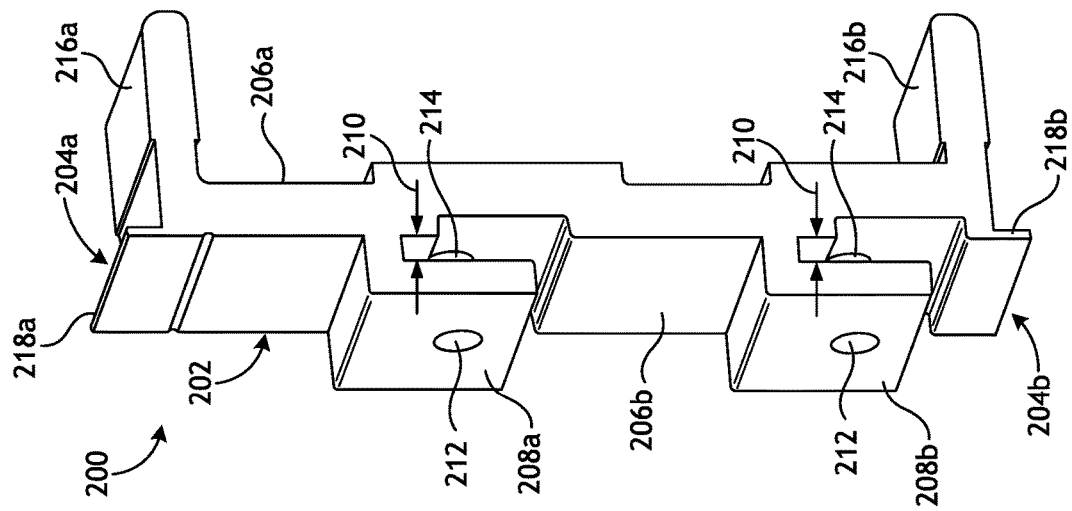
FIGS. 2A and 2B are opposing isometric side views of an example clip that may be used in accordance with the present disclosure.
Figure 2A:
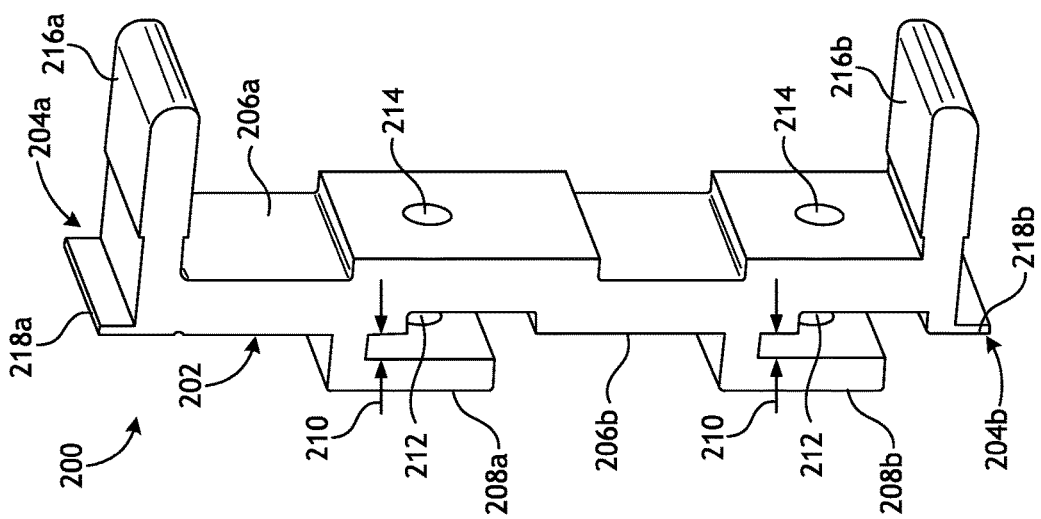

FIGS. 2A and 2B depict front and back isometric views, respectively, of an example clip 200 that may be used in accordance with the present disclosure. The clip 200 may form part of an internal clip assembly operable to align and join a rail (e.g., rails 102a,b,e of FIG. 1) with an adjacent stile (e.g., stiles 102c,d of FIG. 1) at a corresponding corner joint 112 (FIG. 1). As illustrated, the clip 200 may provide an elongated body 202 that includes a first or "upper" end 204a and a second or "lower" end 204b opposite the first end 204a. The body 202 may be made of a variety of rigid materials including, but not limited to, a metal (e.g., aluminum, an aluminum alloy, steel, a steel alloy, etc.), a polymer (e.g., nylon, polypropylene, polyetherimide, polycarbonate, polystyrene, etc.), a composite material (e.g., fiberglass, carbon fiber, etc.), or any combination thereof. The body 202 may be manufactured via a variety of known manufacturing processes including, but not limited to, extruding, injection molding, casting, stamping, machining, additive manufacturing (i.e., 3D printing), or any combination thereof.

While the body 202 is shown in FIGS. 2A-2B having specific dimensions, e.g., length, width, depth, etc., the principles of the present disclosure are equally applicable to clips having varying dimensions. Accordingly, the specific dimensions and shape of the body 202 depicted in FIG. 2 are shown for illustrative purposes and should not be considered limiting to the present disclosure. Moreover, the clip 200 may be used to join members of various lengths, such as tall/short top and bottom rails, allowing a variety of structures to be assembled using a common clip, e.g., to produce a variety of framed assemblies exhibiting different dimensions.

The clip 200 provides a first or "front" side 206a and a second or "back" side 206b opposite the front side 206a. In some embodiments, as illustrated, one or both of the front and back sides 206a,b may be stepped or otherwise define a non-continuous surface extending between the first and second ends 204a,b. The stepped surfaces of the front and back sides 206a,b may help ease manufacturing of the clip 200, and may also provide added strength in areas where the clip 200 will be mounted to a stile (e.g., stiles 102c,d of FIG. 1). In other embodiments, however, one or both of the front and back sides 206a,b may define generally planar or continuous surfaces extending between the first and second ends 204a,b, without departing from the scope of the disclosure.

The clip 200 may provide or otherwise define one or more backing plates, shown as a first backing plate 208a and a second backing plate 208b vertically offset from the first backing plate 208a. While two backing plates 208a,b are depicted, more or less than two may be included on the clip 200, without departing from the scope of the disclosure. As illustrated, the backing plates 208a,b project laterally from the back side 206b of the body 202 and extend downwardly therefrom, thereby forming a gap 210 between each backing plate 208a,b and the back side 206b of the body 202. As described below, the gap 210 may provide an area to accommodate portions of an inner vertical wall of a stile (e.g., stiles 102c,d of FIG. 1), which helps mount the clip 200 to the stile.

Each backing plate 208a,b may define a backing plate aperture 212 that coaxially aligns with a corresponding clip aperture 214 defined in the body 202. In some embodiments, as discussed below, the aligned apertures 212, 214 may be sized to receive a mechanical fastener used to help secure the clip 200 to a stile. In one or more embodiments, the clip apertures 214 defined in the body 202 may comprise unthreaded clearance holes, and the associated mechanical fastener may simply pass (extend) therethrough. In some embodiments, the mechanical fastener may comprise a threaded fastener and the backing plate apertures 212 may likewise be threaded to threadably receive the threaded fastener. In other embodiments, the backing plate apertures 212 may comprise threaded nuts attached to the corresponding backing plates 208a,b to threadably receive the threaded fastener. In yet other embodiments, the backing plate apertures 212 may have a diameter smaller than the diameter of the threaded fastener, thus requiring the threaded fastener to cut its own threads as it advances through the corresponding backing plate aperture 212. In even further embodiments, however, the backing plate apertures 212 may alternatively comprise unthreaded clearance holes and the mechanical fastener may comprise a rivet fastener.

The clip 200 may further provide or otherwise define a first or "upper" projection 216a extending laterally from the body 202 at or near the first end 204a, and a second or "lower" projection 216b extending laterally from the body 202 at or near the second end 204b. In the illustrated embodiment, the projections 216a,b extend generally perpendicular from the front side 206a, but could alternatively extend at an angle offset from perpendicular, without departing from the scope of the disclosure. The projections 216a,b may be sized and otherwise configured to be received within an open end of an adjacent rail (e.g., rails 102a,b,e of FIG. 1). Moreover, the rail may be welded to the clip 200 at one or both of the projections 216a,b with a plug weld or the like.

In some embodiments, as illustrated, one or both of the projections 216a,b may define an enlarged end having a thickness greater than the remaining portions of the projections 216a,b. The enlarged ends of the projections 216a,b may help facilitate a more robust welded interface.

In some embodiments, the clip 200 may further provide or otherwise define a first flange 218a extending vertically upward from the first end 204a, and a second flange 218b extending vertically downward from the second end 204b. As described below, the flanges 218a,b may help enhance a weld applied at or near the flanges between a stile and an adjacent rail. In at least one embodiment, the weld may cause the flanges 218a,b to melt and adhere to the adjacent rail and style.

FIGS. 3-8 are progressive isometric views of one example method of assembling a corner joint 112 of the framed assembly 100 of FIG. 1, according to one or more embodiments. In the illustrated embodiment, the corner joint 112 employs the clip 200 of FIGS. 2A-2B to interconnect and stabilize the connection between the first stile 102c and the bottom rail 102b (FIGS. 7 and 8), as initially introduced in FIG. 1. However, the following method and description may be representative of assembling any of the corner joints 112 indicated in FIG. 1.

Referring first to FIG. 3, the clip 200 is depicted as exploded from the stile 102c. The stile 102c is a generally hollow structure that provides or defines opposing front and back surfaces 302a, 302b. An inner vertical wall 304 extends between the front and back surfaces 302a,b and defines one or more slots 306 (two shown). The slots 306 may be sized and otherwise configured to receive the backing plates 208a,b of the clip 200, which mounts the clip 200 to the stile 102c. One or more stile apertures 308 (two shown) may be defined in the inner vertical wall 304 and may be arranged to coaxially align with the backing plate apertures 212 (FIGS. 2A-2B) and the clip apertures 214 when the clip 200 is properly mounted to the stile 102c. In some embodiments, the stile apertures 308 may comprise unthreaded clearance holes, but could alternatively be threaded.

The clip 200 may be mounted to the stile 102c by first moving the clip 200 toward the inner vertical wall 304 in the direction shown by the arrow A. The backing plates 208a,b may then be aligned with and received within the interior of the stile 102c via the corresponding slots 306 defined in the inner vertical wall 304.

In FIG. 4, the clip 200 is depicted with the backing plates 208a,b (FIGS. 2A-2B and 3) received within the corresponding slots 306 (FIG. 3). In some embodiments, the back side 206b of the clip 200 may rest flush against the outer surface of the inner vertical wall 304 in this position, but this may not be necessary.

In FIG. 5, the clip 200 is moved downward in the direction indicated by the arrow B, to properly seat the backing plates 208a,b (FIGS. 2A-2B and 3) within the corresponding slots 306 (FIG. 3). Moving the clip 200 downward B may position corresponding portions of the inner vertical wall 304 within the gap 210 (FIGS. 2A-2B) defined between the backing plates 208a,b (FIGS. 2A-2B and 3) and the back side 206b of the clip 200. Moving the clip 200 downward B may also align the backing plate and clip apertures 212, 214 (FIGS. 2A-2B) defined in the clip 200 with the stile apertures 308 (FIG. 3) defined in the inner vertical wall 304.

Figure 6:
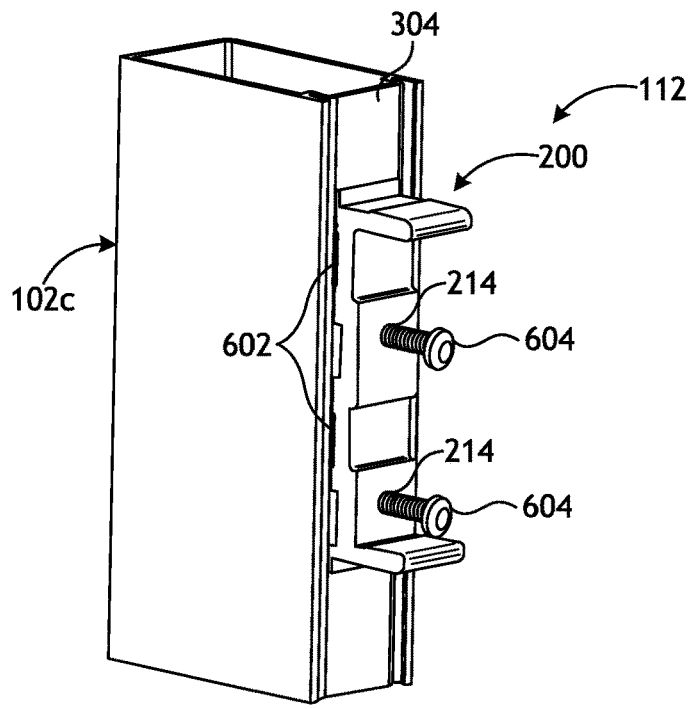

FIG. 6 shows the clip 200 in the process of being secured to the stile 102c. The clip 200 may be removably or permanently secured to the stile 102c in a variety of ways.

In some embodiments, for example, the clip 200 may be welded to the stile 102c using one or more welds 602 (two shown), such as spot welds or fillet welds. In other embodiments, an adhesive may be used to secure the clip 200 to the stile 102c. In yet other embodiments, one or more magnets may be incorporated to secure the clip 200 to the stile 102c via a magnetic attachment.

Alternatively, or in addition to the foregoing methods, the clip 200 may be secured to the stile 102c using one or more mechanical fasteners 604 (two shown). More specifically, each mechanical fastener 604 may be extended through the coaxially aligned backing plate and clip apertures 212, 214 (FIGS. 2A-2B) and the stile apertures 308 (FIG. 3) defined in the inner vertical wall 304. In one embodiment, one or both of the backing plate and stile apertures 212, 308 may exhibit a reduced diameter and the mechanical fasteners 604 may be configured to be received therein via an interference fit that secures the clip 200 to the stile 102c. In other embodiments, as illustrated, the mechanical fasteners 604 may comprise threaded fasteners (e.g., screws, bolts, etc.) that may be threaded into correspondingly threaded backing plate apertures 212, and tightening such threaded fasteners secures the clip 200 to the stile 102c. Alternatively, the backing plate apertures 212 may comprise clearance holes exhibiting a reduced diameter, thus requiring the threaded fasteners to cut their own threads as they advance therethrough. In yet other embodiments, the mechanical fasteners 604 may comprise rivets extendable through the coaxially aligned apertures 212, 214, 308 and deployable to secure the clip 200 to the stile 102c.

Figure 7:
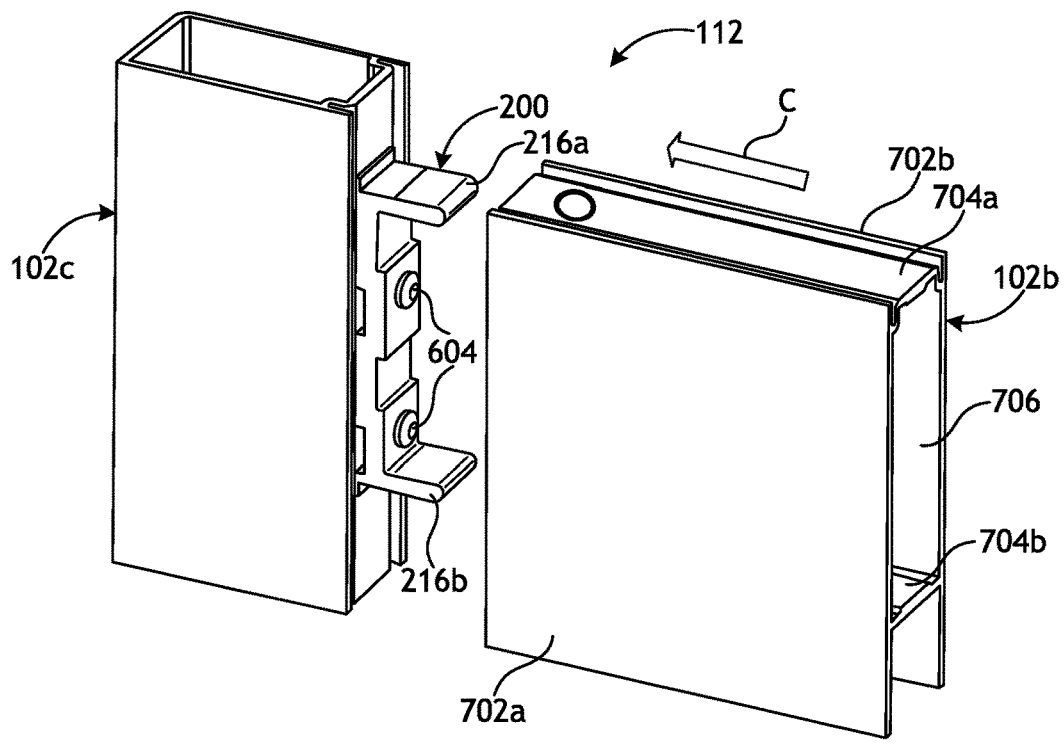

In FIG. 7, the clip 200 is shown secured to the stile 102c using the mechanical fasteners 604. With the clip 200 properly secured, the rail 102b may then be mounted to the stile 102c at the clip 200. As illustrated, similar to the stile 102c, the rail 102b is a generally hollow structure that provides or defines opposing front and back surfaces 702a, 702b. The rail 102b may further provide or define one or more horizontal walls, shown as a first or "upper" horizontal wall 704a and a second or "lower" horizontal wall 704b, alternately referred to as "inner" and "outer" walls, respectively. As illustrated, the horizontal walls 704a,b are vertically offset from each other and extend between the front and back surfaces 702a,b.

The rail 102b may be mounted to the clip 200 by advancing the rail 102b in the direction indicated by the arrow C and receiving the projections 216a,b within the interior 706 of the rail 102b. In some embodiment, the projections 216a,b may be vertically spaced from each other such that they are able to penetrate the interior 706 of the rail 102b between the upper and lower walls 704a,b. In some embodiments, the projections 216a,b may engage or otherwise interact with the upper and lower walls 704a,b. For example, in at least one embodiment, an interference fit may be formed between the projections 216a,b and the upper and lower walls 704a,b upon penetrating the interior 706. In other embodiments, the projections 216a,b may form a snap-fit engagement with the upper and lower walls 704a,b. In yet other embodiments, as described below, the rail 102b may be welded to the clip 200, which serves to couple the rail 102b to the stile 102c.

Figure 8:
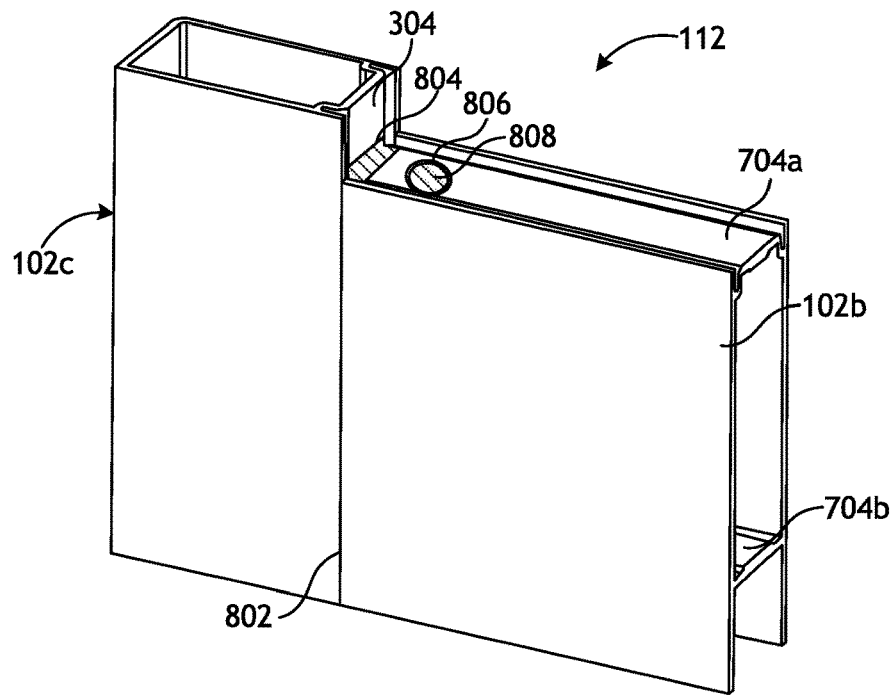

In FIG. 8, when the rail 102b is mounted to the clip 200 (FIGS. 3-7) a seam 802 is formed at the intersection between the rail 102b and the stile 102c. In some embodiments, the rail 102b may be welded to the stile 102c at one or more locations. In one or more embodiments, for example, a fillet weld 804 may be applied at the intersection between the upper horizontal wall 704a of the rail 102b and the inner vertical wall 304 of the stile 102c. While occluded in FIG. 8, a second fillet weld may also be applied at the intersection between the lower horizontal wall 704b and the inner vertical wall 304.

In some embodiments, a weld hole 806 may be defined in the upper horizontal wall 704a and a plug weld 808 may be applied at the weld hole 806 to attach the rail 102b to the clip 200 (FIGS. 3-7) and, more particularly, to the underlying upper projection 216a (FIGS. 2A-2B and 7). Moreover, while occluded in FIG. 8, a second weld hole may be defined in the lower horizontal wall 704b, and a second a plug weld may be applied at the second weld hole to attach the rail 102b to the lower projection 216b (FIGS. 2A-2B and 7), which correspondingly attaches the rail 102b to the stile 102c.

Figure 9:
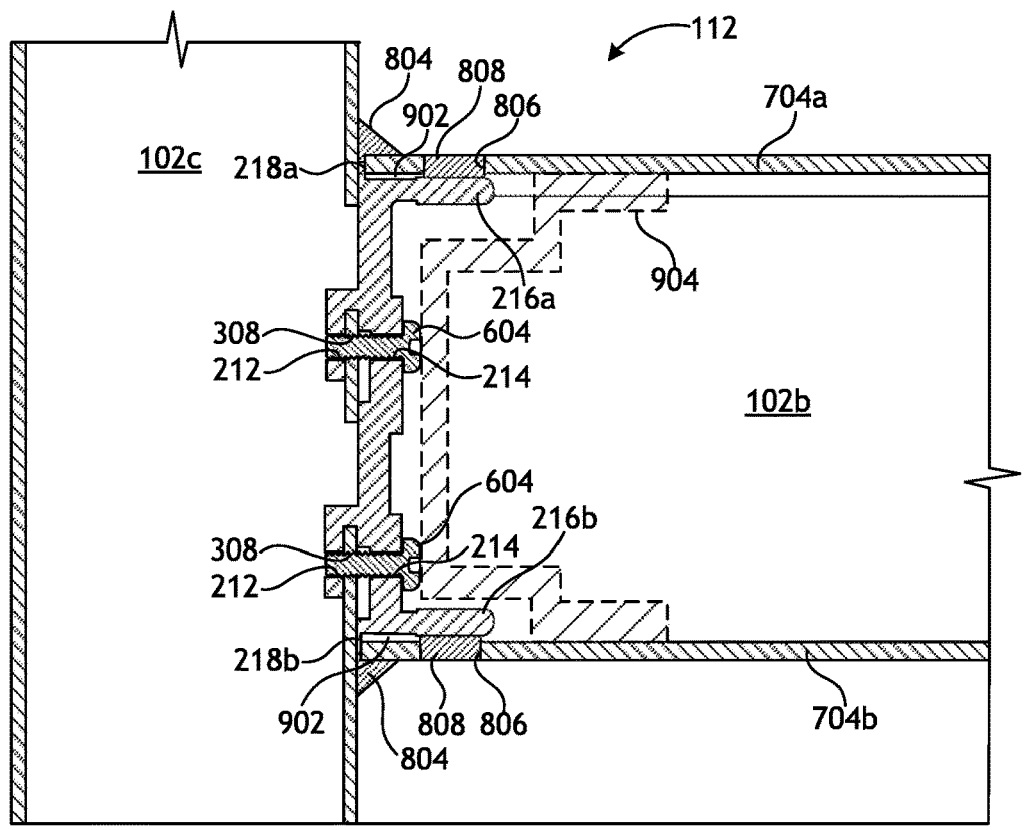
FIG. 9 is a cross-sectional side view of the assembled corner joint of FIGS. 3-8.
Figure 10:
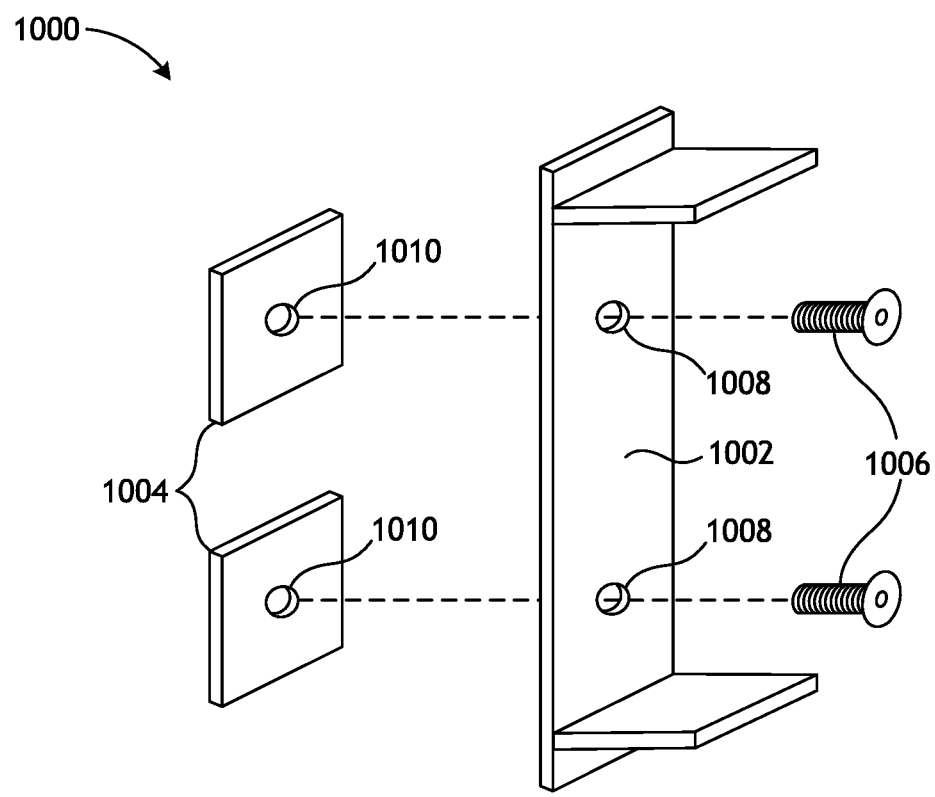
FIG. 10 is an exploded view of a prior art clip assembly.

FIG. 9 is a cross-sectional side view of the assembled corner joint 112 of FIGS. 3-8. As illustrated, the mechanical fasteners 604 are extended through the coaxially aligned backing plate and clip apertures 212, 214 defined in the clip 200 and the stile apertures 308 defined in the inner vertical wall 304. The corner joint 112 can include two fillet welds 804 applied at intersections between the inner vertical wall 304 and the upper and lower horizontal walls 704a,b. In some embodiments, the flanges 218a,b of the clip 200 may interpose the inner vertical wall 304 and the upper and lower horizontal walls 704a,b. In such embodiments, heat generated by the fillet welds 804 may cause the adjacent flanges 218a,b to melt and thereby adhere to the rail 102b. In at least one embodiment, one or both of the flanges 218a,b may melt and flow partially into corresponding gaps 902 defined between the projections 216a,b and the inner surfaces of the horizontal walls 704a,b. Accordingly, the flanges 218a,b may alternately be referred to as "gap fillers."

The corner 112 joint may include two plug welds 808 applied at corresponding weld holes 806 defined in the upper and lower horizontal walls 704a,b. As illustrated, the plug welds 808 attach the rail 102b to the clip 200 (FIGS. 3-7) and, more particularly, to the underlying upper and lower projections 216a,b.

In some embodiments, the rail 102b may include an anti-reverse device 904 (shown in dashed lines) positioned between the upper and lower horizontal walls 704a,b. In one embodiment, the anti-reverse device 904 may be attached to the inner surfaces of the upper and lower horizontal walls 704a,b. When the rail 102b is mounted to the clip 200, the anti-reverse device 904 may be positioned to engage or be positioned adjacent the mechanical fasteners 604. The anti-reverse device 904 may prove advantageous in preventing the mechanical fasteners 604 from reversing out of the coaxially aligned apertures 212, 214, 308.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A framed assembly, comprising:
   a first frame member providing an inner vertical wall extending between opposing front and back surfaces and defining a slot;
   a second frame member positioned adjacent the first frame member at a corner joint and providing a horizontal wall extending between opposing front and back surfaces of the second frame member; and
   a clip having an elongate body providing first and second ends and opposing front and back sides extending between the first and second ends, the clip further providing:
      a backing plate extending laterally from the back side and extending downwardly therefrom and thereby defining a gap between the backing plate and the back side of the body; and
      a projection extending laterally from the front side,
   wherein the backing plate is received within an interior of the first frame member via the slot such that a portion of the inner vertical wall is received within the gap, and
   wherein the projection is received within an interior of the second frame member adjacent the horizontal wall.

2. The framed assembly of claim 1, wherein the framed assembly is selected from the group consisting of a door, a doorframe, a window vent, a window frame, a glazing panel, a curtain wall, a storefront, and a skylight.

3. The framed assembly of claim 1, further comprising:
   a backing plate aperture defined in the backing plate;
   a clip aperture defined in the clip and coaxially aligned with the backing plate aperture;
   a stile aperture defined in the inner vertical wall and coaxially aligned with the backing plate aperture and the clip aperture when the backing plate is received in the slot; and a fastener extendable through the clip aperture, the stile aperture and the backing plate aperture to secure the clip to the first frame member.

4. The framed assembly of claim 3, wherein the mechanical fastener comprises a threaded fastener or a rivet fastener.

5. The framed assembly of claim 3, wherein the mechanical fastener forms an interference fit with at least one of the backing plate aperture and the stile aperture.

6. The framed assembly of claim 1, further comprising a fillet weld applied at an intersection between the inner vertical wall and the horizontal wall.

7. The framed assembly of claim 6, further comprising a flange extending from an end of the clip, wherein heat from the fillet weld melts the flange and causes the flange to adhere to the second frame member.

8. The framed assembly of claim 1, further comprising a plug weld that attaches the second frame member to the clip at the projection.

9. A method of assembling a corner joint of a framed assembly, comprising:
positioning a clip adjacent an inner vertical wall of a first frame member, the clip having an elongate body providing first and second ends and opposing front and back sides extending between the first and second ends, the clip further providing a backing plate extending laterally from the back side and extending downwardly therefrom and thereby defining a gap between the backing plate and the back side of the body;
mounting the clip to the inner vertical wall by inserting the backing plate into a slot defined in the inner vertical wall and receiving a portion of the inner vertical wall within the gap;
securing the clip to the first frame member at the inner vertical wall;
receiving a projection extending from a front side of the clip within an interior of a second frame member;
forming a seam at an intersection between the first and second frame members as the second frame member is mounted to the clip; and
joining the second frame member to the first frame member at one or more locations.

10. The method of claim 9, wherein securing the clip to the first frame member at the inner vertical wall comprises:
coaxially aligning a stile aperture defined in the inner vertical wall with a backing plate aperture defined in the backing plate and a clip aperture defined in the clip; and
extending a mechanical fastener through the clip aperture, the stile aperture and the backing plate aperture.

11. The method of claim 10, wherein the mechanical fastener comprises a threaded fastener and the method further comprises threadably receiving the threaded fastener within the backing plate aperture.

12. The method of claim 10, further comprising forming an interference fit with the mechanical fastener and at least one of the backing plate aperture and the stile aperture.

13. The method of claim 9, wherein the second frame member provides a horizontal wall and joining the second frame member to the first frame member comprises applying a fillet weld at an intersection between the inner vertical wall and the horizontal wall.

14. The method of claim 13, further comprising melting a flange extending from an end of the clip with the fillet weld and thereby causing the flange to adhere to the second frame member.

15. The method of claim 9, wherein the second frame member provides a horizontal wall and joining the second frame member to the first frame member comprises applying a plug weld via a weld hole defined in the horizontal wall of the second frame member and thereby attaching the second frame member to the clip at the projection.

16. A clip assembly for a framed assembly, comprising:
a body having a first end and a second end opposite the first end and defining one or more clip apertures;
one or more backing plates projecting laterally from a back side of the body and extending downwardly therefrom and thereby defining a gap between the backing plate and the back side of the body;
at least one backing plate aperture defined in at least one of the backing plates, each backing plate aperture being coaxially aligned with a corresponding one of the one or more clip apertures;
one or more projections extending laterally from a front side of the body; and
a mechanical fastener extendable through coaxially aligned clip and backing plate apertures.

17. The clip of claim 16, further comprising:
a first flange extending vertically upward from the first end; and
a second flange extending vertically downward from the second end.

18. The clip of claim 16, wherein the mechanical fastener comprises a threaded fastener or a rivet fastener.

* * * * *